United States Patent [19]

Panicci

[11] 4,233,714

[45] Nov. 18, 1980

[54] END CLOSURE

[75] Inventor: Richard L. Panicci, Hanover, Mass.

[73] Assignee: Kiddie Products, Inc., Avon, Mass.

[21] Appl. No.: 858,537

[22] Filed: Dec. 8, 1977

[51] Int. Cl.[2] ........................ A44B 17/00; F16G 15/00

[52] U.S. Cl. ................................ 24/201 R; 24/201 A; 24/230 A; 24/116 A; 403/309

[58] Field of Search ............ 24/201 R, 201 A, 230 A, 24/265 WS, 116 A, 1; 403/309, 311, 313, 344

[56] References Cited

U.S. PATENT DOCUMENTS

| | | | |
|---|---|---|---|
| 465,552 | 12/1891 | Barnes | 403/311 |
| 492,047 | 2/1893 | Otis et al. | 403/309 |
| 2,543,933 | 3/1951 | Pommier | 24/230 A |
| 2,714,269 | 8/1955 | Charles | 24/116 A |
| 2,893,089 | 7/1959 | Bacon | 24/116 A |
| 3,066,501 | 12/1962 | Charles et al. | 24/217 |
| 3,305,254 | 2/1967 | Hopkins | 403/313 |
| 3,974,547 | 8/1976 | Little | 24/116 A |
| 3,982,779 | 9/1976 | Hickey | 403/311 |

FOREIGN PATENT DOCUMENTS

| | | | |
|---|---|---|---|
| 2460505 | 12/1974 | Fed. Rep. of Germany | 24/265 WS |
| 1287476 | 2/1962 | France | 24/265 WS |

*Primary Examiner*—Victor N. Sakran

[57] ABSTRACT

End closure means comprises a latch member having a latch surface, a two part body member defining a latch member receiving recess between the two parts, a hinge connecting the two parts together on one side of the body member, and a pair of mutually engageable headed posts and passages respectively on the two parts and spaced from the latch member recess on the other side of the body member from the hinge. The body member and latch member are at the ends of a self-supporting molded plastic string on which are mounted a plurality of beads.

6 Claims, 6 Drawing Figures

END CLOSURE

This invention relates to end closures and particularly to end closure means integrally formed on and adapted to join opposite ends of a plastic thread or string, such as in a string of children's teething beads.

Teething beads placed on threads or strings have been known to be ingested by children when the ends of the string become detached. Ocassionally, when beads are placed on a highly flexible, e.g., fiber, thread or string, a child will even ingest beads with the string ends still connected. The serious and even catastrophic consequences of such ingestion have indicated the need for an improved end closure to safely secure the string ends and for improved bead strings which will prevent the beads from being placed too deeply within the mouth.

It is, accordingly, a principal object of this invention to provide improved end closure means for safely securing two ends together. It is a further object of this invention to provide end closure means which may be integrally formed with a string of material extending between the ends. It is yet another object to provide end closure means which resemble objects on the string between the ends and which require no separate parts. Yet another object of the invention is to provide end closure means in combination with a string which will reduce or eliminate the likelihood of ingestion of beads on the string.

In general, the invention features closure means comprising a latch member having a latch surface and a body member having two parts defining a latch member receiving recess therebetween adapted to engage the latch surface. The two body member parts, respectively, are provided with facing mutually engageable recesses and protrusions spaced from the latch member recess, the mutually engageable recesses and protrusions having shoulders which resist disengagement after closure to encapsulate the latch member.

In preferred embodiments, the latch member and body membr are integrally formed at oppoisite ends of a thin string of molded, self-supporting, orgainc, thermoplastic material. The body parts are connected on one side by an integrally formed hinge. The mutually engageable recesses and protrusions are spaced from the latch member recess on the sides opposite the hinge and comprise a pair of posts having enlarged heads thereon and passages of matching configuration, shoulders on the heads and in the passages resisting disengagement after assembly.

the latch member recess and the latch member are offset from the axis within the body between the hinge and the posts, extending to an opening on the axis of the body, the latch surface positioned within the body between the posts. The body member when closed encapsulates the latch member and resembles a bead.

Other objects, features and advantages of this invention will be apparent to those skilled in the art from the following detailed description of a preferrec embodiment thereof, taken togehter with the accompanying drawings, in which.

Figure 1:
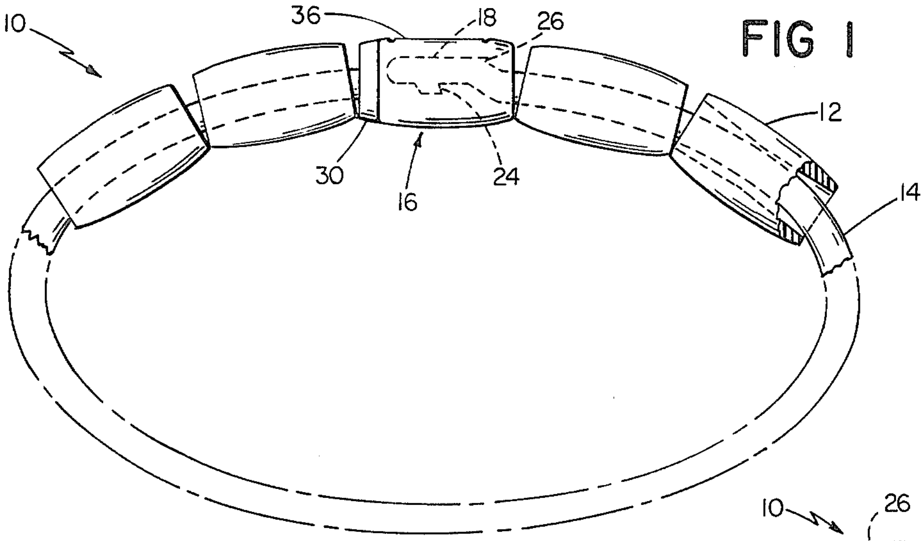
FIG. 1 is a plan view of a string of teething beads including end closure means embodying the invention.
Figure 2:
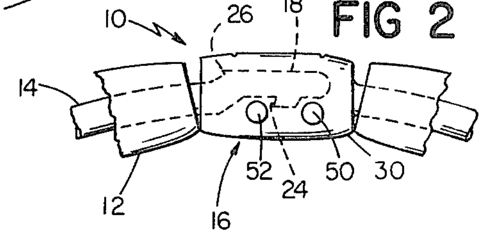
FIG. 2 is a fragmentary view of the reverse side of the beads and end closure means shown in FIG. 1.

A string of teething beads 10 is illustrated in FIGS. 1 and 2. Tubular beads 12 are placed on string 14. End closure means 16 secure the beads on the string. As shown in FIGS. 1 and 2, end closure 16 has an exterior shape resembling one of the beads 12.

Figure 3:
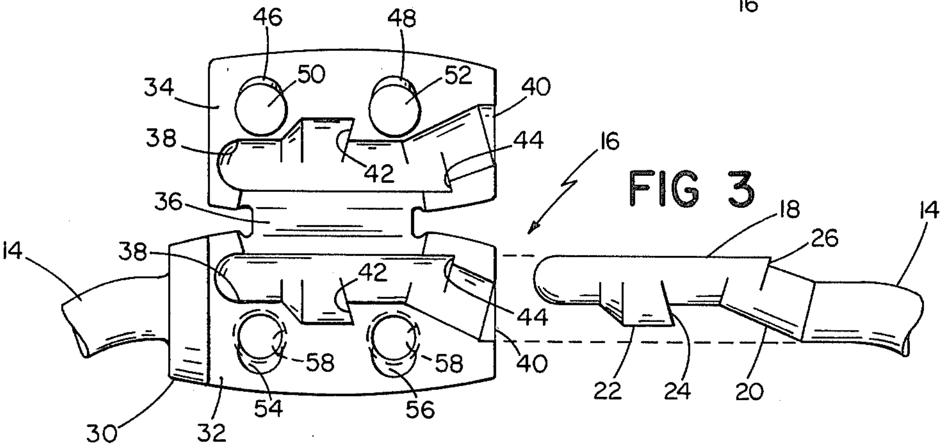
FIG. 3 is an enlarged view of the end closure means of FIG. 1 prior to assembly.
Figure 4:
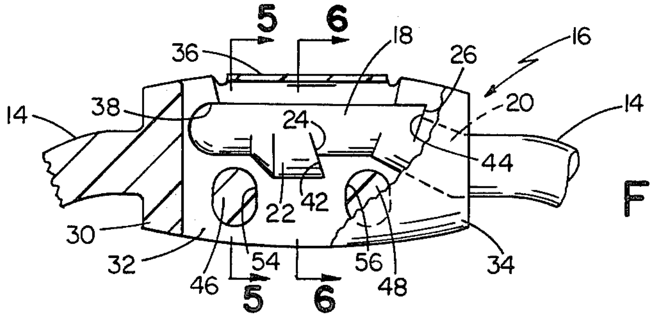
FIG. 4 is a view similar to FIG. 3 of the assembled end closure means partially broken away.

The end closure 16, best shown in FIGS. 3 and 4, comprises a latch member 18 integrally formed at one end of string 14 and a body member 30, externally resembling a bead 12, integrally formed at the other end of string 14.

Figure 6:
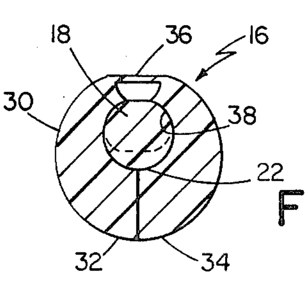
FIG. 6 is a reduced sectional view of the end closure means taken along the line 6—6 of FIG. 4.

Latch member 18 is connected to string 14 by a short section 20 of material extending at an angle from string 14 and the latch member 18, thus offset from string 14, extends on an axis generally parallel to that of body member 30. Midway along the member 18, a radial latch enlargement 22, shown in section in FIG. 6, forms a latching surface, shoulder 24, angled from member 18 rearwardly toward string 14. Another latching surface, shoulder 26, is formed at the junction of member 18 and section 20, also angled rearwardly toward string 14.

Figure 5:
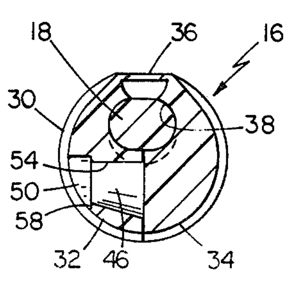
FIG. 5 is a reduced sectional view of the end closure means taken along the line 5—5 of FIG. 4.

Body member 30 comprises two parts 32, 34, one part 32 integral with string 14 and the other part 34 connected to the first part 32 by integral hinge 36 on one side of the parts 32, 34. A latch member receiving recess 38 is defined within body member 30 between parts 32, 34, the recess 38 extending to and definig an opening 40 through which string 14 is connected to latch member 18. Recess 38 has a configuration matching that of the latch member 18 and has shoulders 42, 44 adapted to engage shoulders 24, 26 of the latch member 18 when assembled. The offset configuration of recess 38 and opening 40 allows string 14 to enter body member 30 on its axis to maintain the appearance of member 30 as a bead on the string while offsetting the latch member and recess to avoid interference with other parts, i.e., posts 46, 48 and passages 54, 56. A pair of posts 46, 48 having enlarged heads 50, 52 are provided on one body member part 34 and corresponding passages 54, 56 having configurations matching posts 46, 48, and mutually engageable with posts 46, 48, are provided on the other body member part 32, posts 46, 48 and passages 54, 56 positioned on the sides of recess 38 opposite the hinge 36. Passages 54, 56 form shoulders, one 58 shown in FIG. 5, adapted to engage heads 50, 52 when assembled. The passages 54, 56 are tapered to facilitate placement of the post heads 50, 52 therein. Latch enlargement 22 is located between posts 46, 48.

String 14 and end closure means 16 are integrally molded from organic thermoplastic material. A material which is self-supporting to retain the molded hoop shape of string 14 is employed, such as high density polyethylene or polypropylene.

The beads 12 are initially placed on string 14 and latch member 18 is placed in recess 38 of body member 30 with latch surface shoulders 24, 26 engaging the shoulders 42, 44 of recess 38. The two parts 32, 34 of body member 30 are then closed with posts 46, 48 entering passages 54, 56. Hinge 36 is sized to hold the body parts 32, 34 tightly together when the body parts are closed together. Heads 50, 52 are forced through passages 54, 56, past shoulders 58 in the passages. Body member 30, thus encapsulates the latch member 18. The heads on posts 50, 52 engaging shoulders 58 in passages 54, 56 prevent opening of the body member. Latch member 18 is securely held within body member 30 by the engagement of shoulders 24, 42 and 26, 44. Thus, the beads are secured on string 14. The molded, self-supporting material employed retains the initial hoop shape of the string. Together, the secure fastening of the beads and the hoop shape of the string minimize the likelihood of ingestion of the beads by a child. Advantageously, in appearance, the closure means resembles another bead on the string.

Other embodiments of this invention will be apparent to those skilled in the art which are within the scope of the following claims.

What is claimed is:

1. End Closure means comprising:

a latch member axially extending to an end and having a latch surface extending generally radially relative to the axis of said member at an acute angle facing away from said end; and a body member adapted to encapsulate said latch member, said body member having two parts defining an axially extending latch member receiving recess therebetween, said recess having a shoulder extending generally radially at said acute angle for engaging said latch surface and said recess extending to and defining an opening at one end of said body member opposite the portion of said recess adapted for receiving said latch member and; a hinge extending on one side of the body member extending generally parallel to the axis of said recess and connecting said two body member parts together and spaced from said recess, on the side thereof away from said hinge, said body member parts respectively having at least one recess and protrusion having mutually engageable shoulders, said mutually engageable shoulders in said recess and on said protrusion adapted to permanently secure said body member parts together.

2. The end closure means claimed in claim 1 in which said protrusion comprises a post having an enlarged head, said recess mutually engageable with said post comprising a passage having the configuration of said post, said mutually engageable shoulders are provided by the head on said post and by the matching portion of said passage.

3. The end closure means claimed in claim 2 in which said opening is provided on the axis of said body member and is angularly offset from the remainder of the latch member recess and said latch member has a corresponding offset configuration.

4. The end closure means claimed in claim 3 in which a pair of said posts and passages are provided.

5. The end closure means claimed in claim 2 in which said body member, including said hinge, and said latch member are integrally formed on the ends of a thin hoop-shaped string of molded, self-supporting, organic, thermoplastic material.

6. The end closure means claimed in claim 5 having a plurality of beads on said string.

* * * * *